United States Patent [19]

Inoue et al.

[11] Patent Number: 5,862,023

[45] Date of Patent: Jan. 19, 1999

[54] METAL IN GAP MAGNETIC HEAD HAVING METAL MAGNETIC FILM INCLUDING PRECIOUS METAL LAYER

[75] Inventors: Yoshihiko Inoue; Junichi Honda; Fusashige Tokutake, all of Miyagi, Japan

[73] Assignee: Sony Corporation, Tokyo, Japan

[21] Appl. No.: 847,761

[22] Filed: Apr. 23, 1997

[30] Foreign Application Priority Data

Apr. 26, 1996 [JP] Japan ..................................... 8-108186

[51] Int. Cl.$^6$ .................................................. G11B 5/147
[52] U.S. Cl. ............................................................. 360/126
[58] Field of Search ................... 360/119–120, 125–126, 360/122

[56] References Cited

U.S. PATENT DOCUMENTS

| | | | |
|---|---|---|---|
| 5,084,795 | 1/1992 | Sakakima et al. | 360/120 |
| 5,140,486 | 8/1992 | Yokoyama et al. | 360/125 |
| 5,290,629 | 3/1994 | Kobayashi et al. | 428/332 |
| 5,403,457 | 4/1995 | Nago et al. | 360/126 |
| 5,452,167 | 9/1995 | Nago | 360/126 |
| 5,478,416 | 12/1995 | Takaoka et al. | 148/306 |
| 5,558,944 | 9/1996 | Terunuma | 428/611 |
| 5,666,249 | 9/1997 | Ohmori et al. | 360/123 |
| 5,708,544 | 1/1998 | Kawashima et al. | 360/119 |

FOREIGN PATENT DOCUMENTS

| | | |
|---|---|---|
| 3-150711 | 6/1991 | Japan . |
| 4-367205 | 12/1992 | Japan . |
| 7-99115 | 4/1995 | Japan . |

*Primary Examiner*—Brian E. Miller
*Attorney, Agent, or Firm*—Hill & Simpson

[57] ABSTRACT

A magnetic head is disclosed which has a metal magnetic film formed by first stacking Fe—M—N magnetic thin film layers and precious metal layers such as Pt layers to form a multilayer film and then stacking such multilayer films via an insulating film so that the reproduction output is improved to make the magnetic head suitable for recording on and reproduction from a magnetic recording medium having a large coercive force, such as, a so-called metal tape. On gap forming surfaces of a pair of magnetic core halves, a multilayer structure formed by first forming a multilayer film by stacking magnetic thin film layers having composition of $Fe_xM_yN_z$ (with M being at least one selected from Ta, Zr, Hf, Nb, Ti, Mo and W, and x, y and z indicating atomic percentage and holding relations of $71 \leq x \leq 85$, $6 \leq y \leq 15$, and $9 \leq z \leq 16$) and layers made of at least one selected from Pt, Au, Ag and Pd, and then stacking such multilayer films via at least two layers made of any one of $SiO_2$, $ZrO_2$, $Al_2O_3$ and Cr.

18 Claims, 8 Drawing Sheets

METAL IN GAP MAGNETIC HEAD HAVING METAL MAGNETIC FILM INCLUDING PRECIOUS METAL LAYER

BACKGROUND OF THE INVENTION

1. Field of the Invention

This invention relates to a so-called metal-in-gap type magnetic head including a pair of magnetic core halves with its gap portion made of a metal magnetic film. Particularly, it relates to a magnetic head in which the metal magnetic film has a multilayer structure formed by first forming a multilayer film by stacking Fe—M—N magnetic thin film layers and precious metal layers such as Pt layers and then stacking such multilayer films via an insulating film, so as to improve reproduction output to make the magnetic head suitable for recording on and reproduction from a magnetic recording medium having a large coercive force, such as, a so-called metal tape.

2. Description of the Related Art

Recently, as the recording density of signals has become higher in the field of magnetic recording, magnetic recording media having a large coercive force and a high remanent magnetic flux density are used, such as, metal tapes manufactured by directly coating a non-magnetic support with a ferromagnetic metal material. Accordingly, core materials for magnetic heads are required to have a high saturation magnetic flux density and high permeability.

To meet such requirements, a metal-in-gap type magnetic head (hereinafter referred to as a MIG head) has been proposed in which ferrite is used as a sub-core material while a metal magnetic film having a high saturation magnetic flux density is formed as a main core material formed on the ferrite so that a magnetic gap portion is formed by the metal magnetic film. The MIG head is suitable for recording on and reproduction from a metal tape.

Meanwhile, in accordance with the significant progress in higher recording density in recent years, the magnetic head of the above-described type is required to employ a metal magnetic material which has a higher saturation magnetic flux density for obtaining a large recording magnetic field and exhibits soft magnetic property in order to carry out more satisfactory recording on and reproduction from a magnetic recording medium having a large coercive force, such as, the metal tape.

Also, since a microcrystal metal magnetic film containing Fe as its main component has a high saturation magnetic flux density and exhibits excellent soft magnetic property in the in-plane direction, the microcrystal metal magnetic film has been put into practical use in place of the conventional metal magnetic material for the magnetic head.

However, in the MIG head, though the microcrystal metal magnetic film mainly containing Fe is formed on ferrite in place of the conventional metal magnetic film, the soft magnetic property in the direction of thickness as well as the soft magnetic property in the in-plane direction is important. Therefore, the head efficiency has not been so improved as expected from the excellent soft magnetic property in the in-plane direction of the microcrystal metal magnetic film, and the reproduction output has not been so improved, either.

Thus, the present applicant has already proposed a magnetic head including a pair of magnetic core halves joined and integrated with each other with magnetic gap forming surfaces thereof abutted to each other, and a metal magnetic film formed on the magnetic gap forming surface of at least one of the pair of magnetic core halves, in which the metal magnetic film is made of a multilayer film of stacked magnetic thin film layers having composition of $Fe_xM_yN_z$ and Pt layers, with M being at least one selected from Ta, Zr, Hf, Nb, Ti, Mo and W, and x, y and z indicating atomic percentages and holding relations of $71 \leq x \leq 85$, $6 \leq y \leq 15$, and $9 \leq z \leq 16$. (See the Japanese Patent Application No.8-12956.)

SUMMARY OF THE INVENTION

It is an object of the present invention to provide a magnetic head which is made suitable for recording on and reproduction from the magnetic recording medium having a large coercive force, such as, the metal tape, by significantly improving the reproduction output of the above-described MIG head.

As a result of intensive research to achieve the above-described object, the present inventors have found that, with the Fe—M—N magnetic thin film layer (with M being at least one selected from Ta, Zr, Hf, Nb, Ti, Mo and W), use of a layer made of at least one or more selected from Pt, Au, Ag and Pd as an underlying layer is likely to generate an intense orientation of α-Fe plane (110), thus enhancing uniformity of magnetic property and improving the soft magnetic property of the entire film. The present inventors have also found that the reproducing characteristic is improved by using a multilayer film formed by alternately stacking Fe—M—N magnetic thin film layers and precious metal layers such as Pt layers as a metal magnetic film of the MIG head, while recording and reproducing characteristics of the MIG head in a high-frequency region is further improved by stacking two or more layers of such multilayer film via a layer made of any one of $SiO_2$, $ZrO_2$, $Al_2O_3$ and Cr.

That is, according to the present invention, there is provided a magnetic head comprising a pair of magnetic core halves joined and integrated with each other with magnetic gap forming surfaces thereof abutted to each other, and a metal magnetic film formed on the magnetic gap forming surface of at least one of the pair of the magnetic core halves, in which the metal magnetic film is formed by first forming a multilayer film by alternately stacking magnetic thin film layers having composition of $Fe_xM_yN_z$ (with M being at least one selected from Ta, Zr, Hf, Nb, Ti, Mo and W, and x, y and z indicating atomic percentage and holding relations of $71 \leq x \leq 85$, $6 \leq y \leq 15$, and $9 \leq z \leq 16$) and layers made of at least one selected from Pt, Au, Ag and Pd, and then stacking two or more layers of the multilayer film via a layer made of any one of $SiO_2$, $ZrO_2$, $Al_2O_3$ and Cr.

In this magnetic head, in order to obtain satisfactory underlying effect of the layers made of at least one selected from Pt, Au, Ag and Pd (hereinafter referred to as precious metal layers such as Pt layers) constituting the metal magnetic film, it is preferred that the average thickness per layer of the precious metal layers such as Pt layers is 0.3 to 10.0 nm.

If the average thickness per layer of the precious metal layers such as Pt layers is smaller than 0.3 nm, a satisfactory underlying effect cannot be obtained. If it is greater than 10.0 nm, the excessively large thickness having a shape effect causes the precious metal layers such as Pt layers to act as false gaps and thus causes generation of swell in the reproduction output characteristic.

Although two or more of the metal magnetic films are stacked via the precious metal layers such as Pt layers having the thickness of 0.3 to 10.0 nm, the upper limit of the number of metal magnetic films to be stacked is approximately 10.

The precious metal layers such as Pt layers and the magnetic thin film layers are formed by a vacuum thin film forming method exemplified by a vacuum evaporation method, a sputtering method or an ion plating method. If the thickness of the precious metal layers such as Pt layers formed, for example, by sputtering, is 0.3 nm, it can be considered that the precious metal layer such as Pt layer is not formed in a plain thin film but has particles dotted like islands. Thus, the thickness of the precious metal layers such as Pt layers is expressed by the average thickness per layer.

Also, in this magnetic head, it is preferred that the magnetic thin film layers forming the metal magnetic film has a thickness per layer of 0.05 to 1.0 μm in order to obtain satisfactory underlying effect of the precious metal layers such as Pt layers.

If the thickness of the magnetic thin film layers is smaller than 0.05 μm, the number of film forming processes, such as sputtering, for forming the magnetic thin film layers increases, thus deteriorating productivity. In addition, the total number of the precious metal layers such as Pt layers increases, thus lowering the effective saturation magnetic flux density. On the contrary, if the thickness of the magnetic thin film layers exceeds 1.0 μm, the underlying effect of the precious metal layers such as Pt layers deteriorates.

When the above-mentioned Fe—M—N magnetic thin film layer is formed, annealing is performed after film forming. In this processing, metal compounds made of Fe and at least one selected from Pt, Au, Ag and Pd (hereinafter referred to as precious metal compounds such as Fe—Pt) are generated.

Since the precious metal compounds such as Fe—Pt are hard magnetic materials having positive magnetostriction, increase in content of the precious metal compounds such as Fe—Pt in the metal magnetic film causes not only increase in the coercive force of the metal magnetic film but also significant shift of the magnetostriction of the metal magnetic film toward negative values, which is not preferred.

In order to restrict the amount of the precious metal compounds such as Fe—Pt to avoid the phenomena as described above, it is preferred that the total thickness of the precious metal layers such as Pt layers within the metal magnetic thin film is not more than 5%, and more preferably not more than 2%, of the overall thickness of the metal magnetic film.

Further, the magnetostriction of the magnetic layer can be reduced to approximately zero by setting the magnetostriction of the Fe—M—N magnetic thin film layer to an appropriate positive value in consideration of the proportion of the precious metal layers such as Pt layers in the total film thickness.

In the magnetic head of the present invention, the multilayer film of alternately stacked Fe—M—N magnetic thin film layers and precious metal layers such as Pt layers is formed as the metal magnetic film on the magnetic gap forming surface of at least one of the pair of magnetic core halves. In forming microcrystal from the amorphous state by heat treatment after forming the Fe—M—N magnetic thin film layers in the manufacturing process of this magnetic head, the underlying effect of the precious metal layers such as Pt layers causes an intense orientation of α-Fe plane (110) in the heat-treated Fe—M—N magnetic thin film layers, thus improving uniformity of the magnetic property of the metal magnetic film and soft magnetic property. Such orientation tends to be dispersed as the thickness of the magnetic film increases. However, a preferential orientation due to the precious metal layers such as Pt layers can be generated over the entire film by increasing the number of the precious metal layers such as Pt layers and reducing the thickness of the magnetic film to a certain extent.

Also, in the magnetic head of the present invention, since the metal magnetic film is the multilayer film formed by alternately stacking the Fe—M—N magnetic thin film layers and the precious metal layer such as Pt layers, the precious metal compounds such as Fe—Pt are generated in the metal magnetic film and therefore a magnetically hard portions are generated. Since these portions function to prevent movement of the magnetic domain, rotation magnetization is promoted and the permeability in the high frequency regions in the metal magnetic film is improved.

In addition, since two or more layers of the multilayer film of stacked FE—M—N magnetic thin film layers and precious metal layers such as Pt layers are stacked via the layer made of any one of $SiO_2$, $ZrO_2$, $Al_2O_3$ and Cr (hereinafter referred to as a non-magnetic layer such as $SiO_2$), a so-called magnetostatic coupling layer is formed which has a magnetic structure such that magnetic domains with the same direction of magnetization are uniformly stacked in an antiparallel manner in the direction of thickness within the film surface. Therefore, domain wall resonance in applying a high-frequency magnetic field is restricted and the permeability in high frequencies is improved. Consequently, the recording and reproducing characteristics of the MIG head using the above-described magnetic multilayer film in the high-frequency region is improved.

In the magnetic head of the present invention, as the average thickness per layer of the precious metal layers such as Pt layers forming the metal magnetic film is set to 0.3 to 10.0 nm and as the thickness per layer of the magnetic thin film layers forming the metal magnetic film is set to 0.05 to 1.0 μm, the preferential orientation in the entire magnetic thin film layers due to the underlying effect of the precious metal layers such as Pt layers is easily generated. By setting the thickness of the precious metal layers such as Pt layers to the above-mentioned value, the precious metal layers do not act as false gaps.

Moreover, in the magnetic head of the present invention, since the ratio of the total thickness of the precious metal layers such as Pt layers in the overall thickness of the metal magnetic film is several percent, reduction in the effective saturation magnetic flux density (Bs) is very small. Also, though the precious metal layers such as Pt layers are arrayed in parallel to the magnetic gap g, the precious metal layers have a thickness of only several nanometers and therefore do not act as false gaps.

It is preferred that the thickness of the non-magnetic layer such as $SiO_2$ is 0.5 to 10.0 nm. If the thickness of the non-magnetic layer is smaller than 0.5 nm, the non-magnetic layer does not function as a magnetically discontinuous layer and therefore does not form the magnetostatic coupling layer. On the contrary, if the thickness exceeds 10.0 nm, the non-magnetic layer may act as a false gap. The reduction in eddy current and restriction of domain wall resonance in the high-frequency region by formation of the magnetostatic coupling film due to the non-magnetic layer such as $SiO_2$ significantly improves the high-frequency characteristic of the entire soft magnetic film.

Thus, the multilayer films including the precious metal layers such as Pt layers having the underlying effect are stacked via the non-magnetic layer such as $SiO_2$ so as to form the soft magnetic magnetostatic coupling thin film, and the soft magnetic magnetostatic coupling thin film is applied to the metal-in-gap type magnetic head. In this manner, the soft magnetic property is improved and the permeability in the direction of thickness and the high-frequency permeability are improved, so that the reproducing characteristic is expected to be significantly improved.

As a method for forming the Fe—M—N magnetic thin film layers, the precious metal layers such as Pt layers and the non-magnetic layer such as $SiO_2$, a vacuum thin film forming technique exemplified by a vacuum evaporation method, a sputtering method, or an ion plating method may be employed. In this case, the increase in the number of sputtering processes can be overcome by employing a multi-target device.

DETAILED DESCRIPTION OF THE PREFERRED EMBODIMENTS

A preferred embodiment of the present invention will now be described in detail with reference to the drawings.

Figure 1:
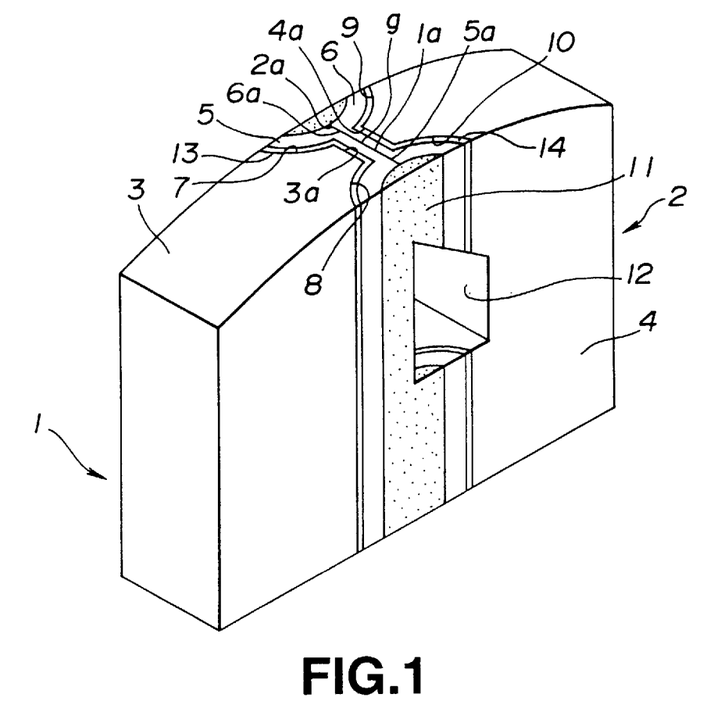
FIG. 1 is a perspective view showing an example of a magnetic head according to the present invention.
Figure 2:
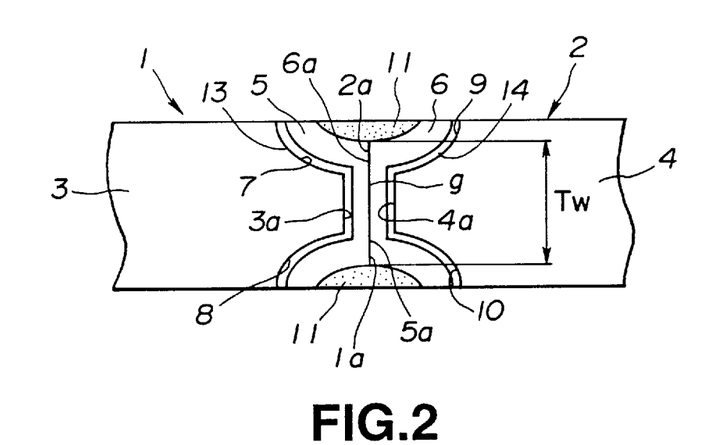
FIG. 2 is an enlarged schematic plan view showing the example of the magnetic head according to the present invention.

A magnetic head of this embodiment is formed, as shown in FIGS. 1 and 2, by joining and integrating a pair of right and left magnetic core halves 1 and 2 which are separately produced on the two sides of a magnetic gap g located substantially at the center of a magnetic recording medium contact surface by abutting magnetic gap forming surfaces 1a and 2a as abutting surfaces.

The magnetic core halves 1 and 2 are composed of magnetic core substrates 3 and 4 as sub-core sections, and metal magnetic films 5 and 6 as main core sections. The magnetic core substrates 3 and 4 are made of a soft magnetic oxide material, such as Mn—Zn ferrite or Ni—Zn ferrite, to form the sub-core sections constituting a closed magnetic circuit together with the metal magnetic films 5 and 6. On the sides of main surfaces 3a and 4a of the magnetic core substrates 3 and 4 facing the magnetic gap forming surfaces 1a and 2a, track width regulating grooves 7, 8, 9 and 10 for regulating the track width Tw of the magnetic gap g are formed in arc shape in a direction of depth from near both ends of the magnetic gap g. The track width regulating grooves 7, 8, 9 and 10 are filled with a non-magnetic material 11, such as glass, for the purpose of securing the contact characteristic with the magnetic recording medium and preventing partial wear due to sliding.

On the main surface 4a, facing the magnetic gap forming surface 1a, of the magnetic core substrate 4 of the magnetic core substrates 3 and 4, a winding groove 12 is formed which has a substantially U-shaped cross section and adapted for regulating the depth of the magnetic gap g and for winding a coil, not shown. The winding groove may be formed similarly in the other magnetic core substrate 3.

Meanwhile, the metal magnetic films 5 and 6 function as the main core sections forming a closed magnetic circuit together with the magnetic core substrates 3 and 4. The metal magnetic films 5 and 6 are formed from a front gap portion to a back gap portion on the corresponding main surfaces 3a and 4a which face the magnetic gap forming surfaces 1a and 2a and which are facing surfaces of the magnetic core substrates 3 and 4. Therefore, facing surfaces 5a and 6a of the metal magnetic films 5 and 6 become the magnetic gap forming surfaces 1a and 2a of the magnetic core halves 1 and 2. The metal magnetic films 5 and 6 are formed not only on the main surfaces 3a and 4a as the facing surfaces of the magnetic core substrates 3 and 4 but also within the track width regulating grooves 7, 8, 9 and 10. The metal magnetic film 5 is also formed on the entire surface within the winding groove 12 or at least a part thereof.

Figure 3:
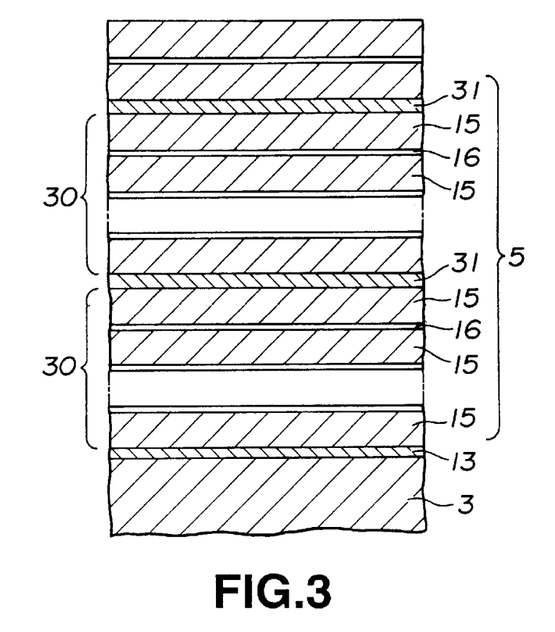
FIG. 3 is an enlarged cross-sectional view showing an example of a metal magnetic film of the magnetic head according to the present invention.

Particularly, in the magnetic head of this embodiment, the metal magnetic films 5 and 6 are multilayer films formed by alternately stacking Fe—M—N magnetic thin film layers 15 and precious metal layers such as Pt layers 16, as shown in FIG. 3. In FIG. 3, only the metal magnetic film 5 is shown. The multilayer film structure is denoted by a numeral 30 in FIG. 3. Further, two more of the multilayer films 30 are stacked via a non-magnetic layer such as $SiO_2$ 31.

The Fe—M—N magnetic thin film layer 15 has a composition of $Fe_xM_yN_z$, where M is at least any one of Ta, Zr, Hf, Nb, Ti, Mo and W, and x, y and z indicate atomic percentage and hold relations of $71 \leq x \leq 85$, $6 \leq y \leq 15$, and $9 \leq z \leq 16$.

Further, in the magnetic head of this embodiment, anti-reaction films 13 and 14 are formed on the corresponding magnetic core substrates 3 and 4, and the metal magnetic films 5 and 6 are formed on the anti-reaction films 13 and 14 so as to prevent diffusion reaction between ferrite as a typical constituent material of the magnetic core substrates 3 and 4 on one hand and the metal magnetic films 5 and 6 on the other and thus to restrict generation of a false gap.

In the magnetic head of this embodiment, as described above, the metal magnetic films 5 and 6 are the multilayer films composed of the Fe—M—N magnetic thin film layers 15 and the precious metal layers such as Pt layers 16. These metal magnetic films 5 and 6 are formed, as shown in FIG. 3, by first forming the multilayer film 30 by alternately stacking the Fe—M—N magnetic thin film layers 15 having the above-described composition and the precious metal layers such as Pt layers 16 in this order on the anti-reaction film 13, and then stacking two or more of the multilayer films 30 via the non-magnetic layer such as $SiO_2$ 31.

As the anti-reaction film 13, a layer made of at least one or more of Pt, Au, Ag and Pd functioning also as the underlying film for the metal magnetic film 5 may be employed.

Figure 4:
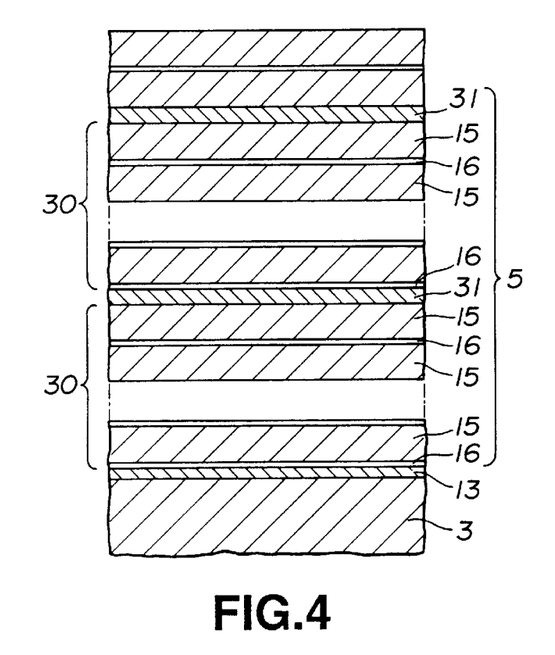
FIG. 4 is an enlarged cross-sectional view showing another example of the metal magnetic film of the magnetic head according to the present invention.

The metal magnetic film 5 may be, as shown in FIG. 4, a multilayer film formed by alternately stacking the precious metal layers such as Pt layers 16 and the Fe—M—N magnetic thin film layers 15 in this order on the anti-reaction film 13. In this case, as the anti-reaction film 13 and the precious metal layers such as Pt layers 16 are stacked in contrast to the case of FIG. 3, both anti-reaction effect and underlying effect can be obtained.

In the magnetic head of this embodiment, the uppermost film of the multilayer film forming the metal magnetic film 5 may be either of the Fe—M—N magnetic thin film layer 15 and the precious metal layer such as Pt layer 16.

As a matter of course, similar to the metal magnetic film 5, the metal magnetic film 6 formed on the other magnetic core substrate 4 has the multilayer structure formed by first forming the multilayer film 30 of stacked Fe—M—N magnetic thin film layers 15 and precious metal layers such as Pt layers 16 and then stacking two or more of the multilayer films 30 via the non-magnetic layer such as $SiO_2$ 31.

In the magnetic head of this embodiment, the thickness per layer of the Fe—M—N magnetic thin film layer 15 forming the metal magnetic films 5 and 6 is set to 0.05 to 1.0 $\mu$m. The average thickness per layer of the precious metal layer such as Pt layer 16 forming the metal magnetic films 5 and 6 is set to 0.3 to 10.0 nm.

Moreover, in the magnetic head of this embodiment, the total thickness of the precious metal layers such as Pt layers 16 in the metal magnetic films 5 and 6 is several percent or less of the overall thickness of the metal magnetic films 5 and 6.

In the magnetic head of this embodiment, as described above, as the metal magnetic films 5 and 6, two or more of the multilayer films of stacked Fe—M—N magnetic thin film layers 15 and precious metal layers such as Pt layers 16 are stacked via the non-magnetic layer such as $SiO_2$ 31 on the magnetic gap forming surfaces 1a and 2a of the pair of magnetic core halves 1 and 2.

The Fe—M—N magnetic thin film layers 15 are formed by performing heat treatment after film forming so as to generate microcrystal from an amorphous state, as will be described later in the description of the manufacturing method. In the magnetic head of this embodiment, the underlying effect of the precious metal layers such as Pt layers 16 causes an intense orientation of $\alpha$-Fe plane (110) to occur in the Fe—M—N magnetic thin film layers 15 after the heat treatment, so that uniformity of magnetic property of the metal magnetic films 5 and 6 and hence soft magnetic properties are improved.

Moreover, in the magnetic head of this embodiment, the precious metal compounds such as Fe—Pt are generated in the metal magnetic films 5 and 6, thus generating magnetically hard portions. Since these portions function to prevent movement of magnetic domains, rotation magnetization is promoted and therefore the permeability in the high frequency regions in the metal magnetic films 5 and 6 is improved.

Figure 5:
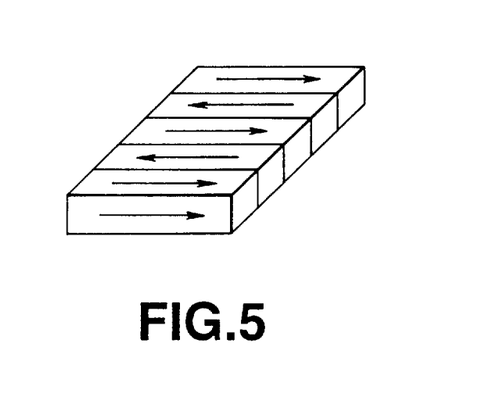
FIG. 5 is a schematic view showing the structure of a magnetic domain of a magnetic thin film utilizing Kerr effect, that is, an Fe—Ta—N single-layer film.
Figure 6:
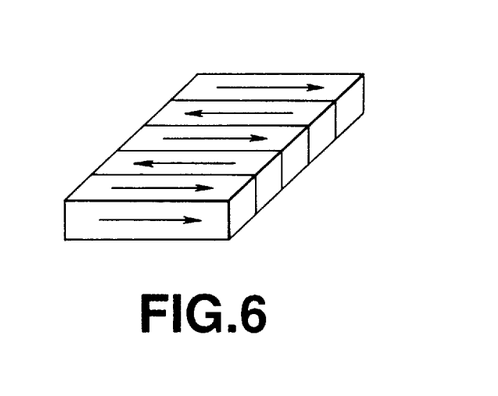
FIG. 6 is a schematic view showing the structure of a magnetic domain of a magnetic thin film utilizing Kerr effect, that is, a multilayer film of Fe—Ta—N layers/precious layers such as Pt layers without having an $SiO_2$ layer.
Figure 7:
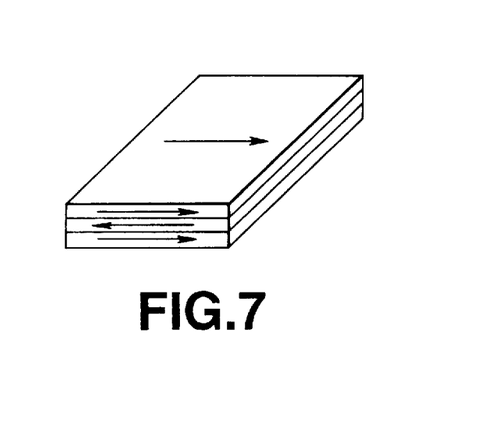
FIG. 7 is a schematic view showing the structure of a magnetic domain of a magnetic thin film utilizing Kerr effect, that is, a multilayer film of (Fe—Ta—N layers/precious layers such as Pt layers)/$SiO_2$ layers.

FIGS. 5 to 7 show magnetic domain structures of the magnetic thin films as a result of observation by a magnetic domain monitor utilizing Kerr effect. FIG. 5 is a schematic view showing the magnetic domain structure of an Fe—Ta—N single-layer film. FIG. 6 is a schematic view showing the magnetic domain structure of a multilayer film of Fe—Ta—N layers/precious metal layers such as Pt layers without having a non-magnetic layer such as $SiO_2$. FIG. 7 is a schematic view showing the magnetic domain structure of a multilayer film composed of (Fe—Ta—N layers/precious metal layers such as Pt layers)/the non-magnetic layer such as $SiO_2$ 31.

As clear from FIG. 7, a so-called magnetostatic coupling film is formed by providing the non-magnetic layer such as $SiO_2$ 31 in the Fe—Ta—N/Pt multilayer film. Even when the thickness of the precious metal layers such as Pt layers is set to 3.0 nm, a magnetic domain structure similar to that of FIG. 7 is obtained.

Thus, since the non-magnetic layer such as $SiO_2$ 31 functions as a magnetically discontinuous layer though the precious metal layers such as Pt layers 16 do not function as magnetically discontinuous layers, the non-magnetic layer such as $SiO_2$ 31 needs to be provided in order to obtain the magnetostatic coupling film. Although at least two or more of such magnetostatic coupling films may be provided, the above-described effect is obtained by providing an even number, not smaller than two, of such magnetostatic coupling films.

Moreover, in the magnetic head of this embodiment, since the average thickness per layer of the precious metal layers such as Pt layers 16 forming the metal magnetic films 5 and 6 is set to 0.3 to 10.0 nm while the thickness per layer of the Fe—M—N magnetic thin film layers 15 forming the metal magnetic films 5 and 6 is set to 0.05 to 1.0 $\mu$m, the above-mentioned preferential orientation in the Fe—M—N magnetic thin film layers 15 due to the underlying effect of the precious metal layers such as Pt layers 16 is easily generated over the entire film. Since each of the precious metal layers such as Pt layers 16 has the above-mentioned thickness, the precious metal layers such as Pt layers 16 do not act as false gaps.

Further, in the magnetic head of this embodiment, the ratio of the total thickness of the precious metal layers such as Pt layers 16 is several percent or less of the overall thickness of the metal magnetic films 5 and 6. Therefore, reduction of the effective saturation magnetic flux density can significantly be restricted.

A method for manufacturing the magnetic head of this embodiment will now be described in the order of processes.

Figure 8:
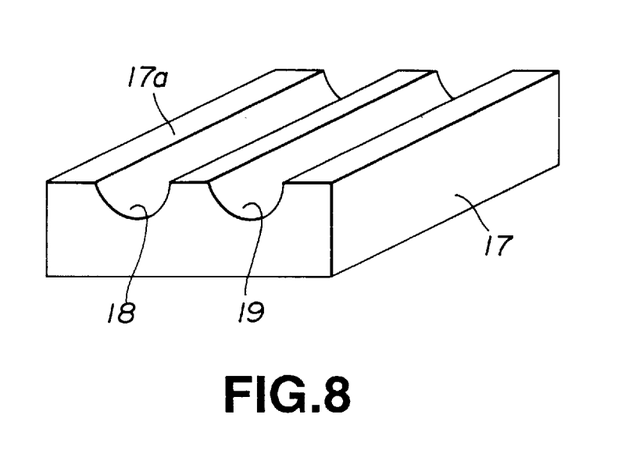
FIG. 8 is a perspective view showing a manufacturing method of the magnetic head according to the present invention in the order of processes, that is, a process of forming track width regulating grooves in a substrate.

First, a plate-like substrate 17 made of, for example, Mn—Zn ferrite is prepared, as shown in FIG. 8. Then, a plurality of (two in the case of FIG. 8) track width regulating grooves 18 and 19 having a substantially semi-circular cross section are formed on a main surface 17a of the substrate 17, as shown in FIG. 8. The track width regulating grooves 18 and 19 are formed in the direction of, for example, the width of the substrate 17. A spacing with the same width as a predetermined track width is defined between the track width regulating grooves 18 and 19.

Figure 9:
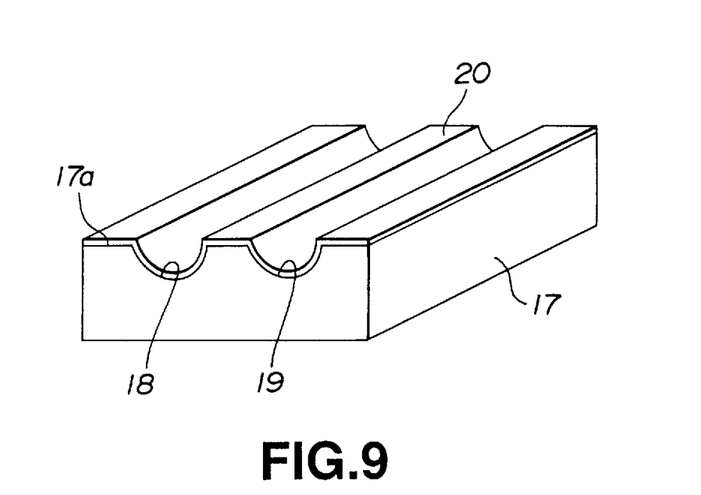
FIG. 9 is a perspective view showing the manufacturing method of the magnetic head according to the present invention in the order of processes, that is, a process of forming an anti-reaction film on the substrate.

An anti-reaction film 20 is formed on the main surface 17a of the substrate 17 including the track width regulating grooves 18 and 19 by sputtering or the like, as shown in FIG. 9. In this embodiment, an $SiO_2$ layer having a thickness of 4 nm is formed as the anti-reaction film 20 in order to improve the anti-reaction effect.

Figure 10:
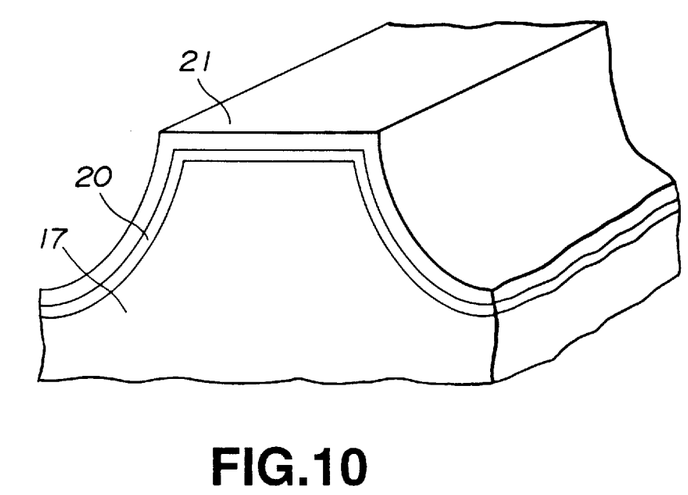
FIG. 10 is an enlarged perspective view showing the manufacturing method of the magnetic head according to the present invention in the order of processes, that is, a process of forming an Fe—M—N magnetic thin film layer on the anti-reaction film.
Figure 11:
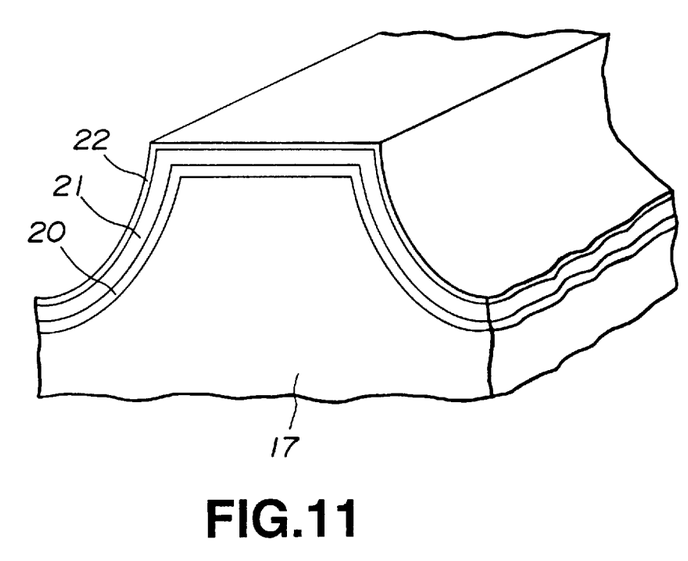
FIG. 11 is an enlarged perspective view showing the manufacturing method of the magnetic head according to the present invention in the order of processes, that is, a process of forming a precious metal layer such as Pt layer on the Fe—M—N magnetic thin film layer.
Figure 12:
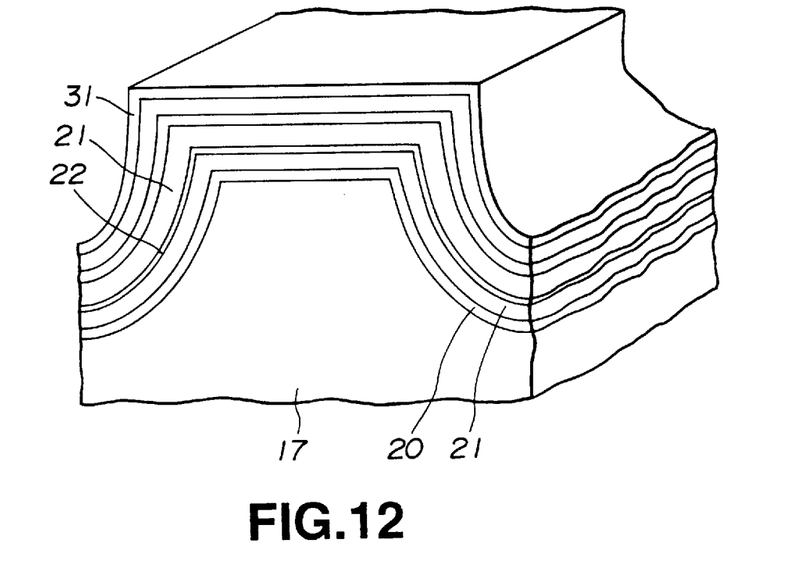
FIG. 12 is an enlarged perspective view showing the manufacturing method of the magnetic head according to the present invention in the order of processes, that is, a process of forming an Fe—M—N magnetic thin film layer on the precious metal layer such as Pt layer.

Then, as shown in FIG. 10, an Fe—M—N magnetic thin film layer 21 having the above-described composition is formed on the anti-reaction film 20. Subsequently, a precious metal layer such as Pt layer 22 is formed on the Fe—M—N magnetic thin film layer 21, as shown in FIG. 11, and another Fe—M—N magnetic thin film layer 21 is formed on the precious metal layer such as Pt layer 22, as shown in FIG. 12. Thus, the Fe—M—N magnetic thin film layers 21, the precious metal layers such as Pt layers 22 and a non-magnetic layer such as $SiO_2$ 31 are sequentially stacked.

Figure 13:
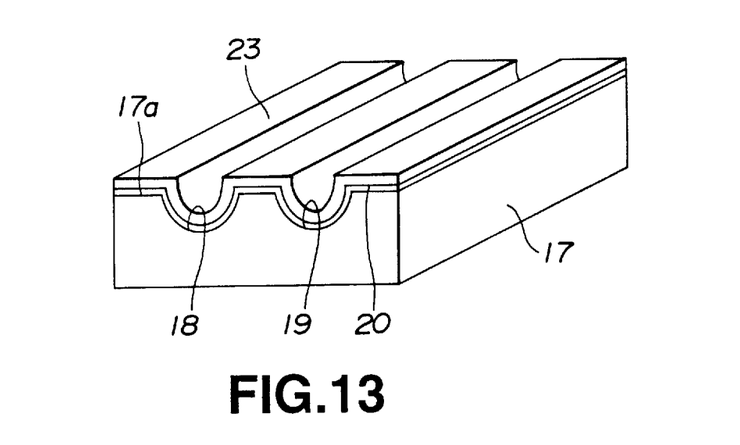
FIG. 13 is a perspective view showing the manufacturing method of the magnetic head according to the present invention in the order of processes, that is, a state that the anti-reaction film and the metal magnetic film have been formed on the substrate.

As shown in FIG. 13, the Fe—M—N magnetic thin film layers 21 and the precious metal layers such as Pt layers 22 are sequentially stacked to form a multilayer film, and two or more of the multilayer films are stacked via the non-magnetic layer such as $SiO_2$ 31 to form a metal magnetic film 23 as a multilayer film. At this point, the Fe—M—N magnetic thin film layer 21 is in an amorphous state.

In this embodiment, an Fe—Ta—N microcrystal magnetic thin film is formed as the Fe—M—N magnetic thin film layer 21. That is, the metal magnetic film 23 has a multilayer structure of (Fe—Ta—N magnetic thin film layer/ precious metal layer such as Pt layer/Fe—Ta—N magnetic thin film layer . . . /Fe—Ta—N magnetic thin film layer)/ non-magnetic layer such as $SiO_2$/(Fe—Ta—N magnetic thin film layer/precious metal layer such as Pt layer/Fe—Ta—N magnetic thin film layer . . . /Fe—Ta—N magnetic thin film layer)/non-magnetic layer such as $SiO_2$ . . . /(Fe—Ta—N magnetic thin film layer/precious metal layer such as Pt layer/Fe—Ta—N magnetic thin film layer . . . /Fe—Ta—N magnetic thin film layer).

Although the first and last layers are Fe—Ta—N magnetic thin film layers 21 in this embodiment, the first and last layers may also be the Fe—M—N magnetic thin film layers 21 or the precious metal layers such as Pt layers 22 for obtaining similar effects. Moreover, though the Fe—Ta—N magnetic thin film layer is used as the Fe—M—N magnetic thin film layer 21 in this embodiment, other metals than Ta may be used for the metal part represented by M for obtaining similar effects.

As described above, in this embodiment, the thickness of the $SiO_2$ layer of the anti-reaction film 20 is 3 nm. The metal magnetic film 23 as the multilayer film of the Fe—Ta—N magnetic thin film layers 21, the precious metal layers such as Pt layers 22 and the non-magnetic layer such as $SiO_2$ 31 is formed to a total thickness of 4.0 μm by stacking eight five-layer films of Fe—Ta—N magnetic thin film layers/ precious metal layers such as Pt layers, with the precious metal layer such as Pt layer 22 having a thickness of 1.0 nm, via the $SiO_2$ layer having a thickness of 2.0 nm.

In comparison, a magnetic head which has a single-layer Fe—Ta—N microcrystal magnetic thin film with a total thickness of 4.0 μm without having the precious metal layers such as Pt layers and the non-magnetic layer such as $SiO_2$ 31, and a magnetic head which has a multilayer film with a total thickness of 4.0 μm formed by stacking forty Fe—Ta—N magnetic thin film layers/precious metal layers such as Pt layers, with the Pt layer having a thickness of 1.0 nm, are produced.

Then, a substrate similar to the substrate 17 is prepared, and track width regulating grooves, an anti-reaction film and metal magnetic films are formed by processes similar to the above-mentioned processes. On this substrate, a winding groove having a substantially U-shaped cross section is formed in a direction perpendicular to a track width regulating groove forming surface.

An $SiO_2$ film with a thickness of 100 nm as a spacer for the magnetic gap is formed on the metal magnetic film of each substrate.

Figure 14:
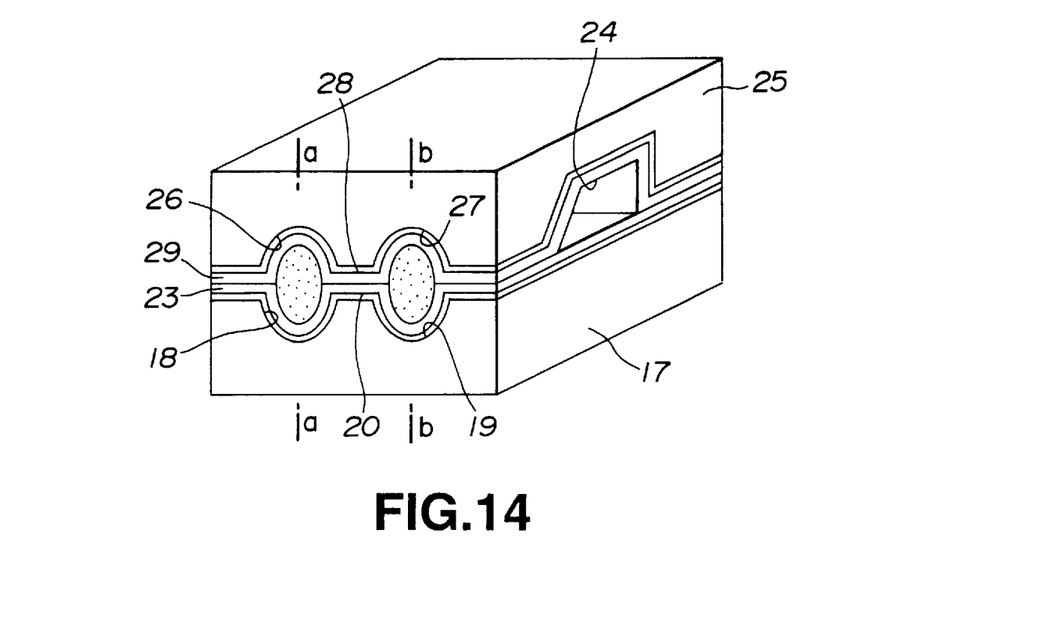
FIG. 14 is a perspective view showing the manufacturing method of the magnetic head according to the present invention in the order of processes, that is, a process of joining and integrating substrates to each other.

Subsequently, as shown in FIG. 14, the substrate 17 and a substrate 25 having a winding groove 24 similar to that of the substrate 17 were abutted against each other while aligning the positions of the track width regulating grooves 18, 19, 26 and 27. A glass bar is inserted into the winding groove 24 and heat treatment is performed to join and integrate the substrates 17 and 25 by glass fusion.

As a result of the heat treatment for such glass fusion, microcrystal is formed in the Fe—M—N magnetic thin film layer 21 from an amorphous state, thus forming Fe—Ta—N microcrystal magnetic thin film.

At this point, the underlying effect of the precious metal layer such as Pt layer 22 causes an intense orientation of α-Fe plane (110) to occur in the Fe—M—N magnetic thin film layer 21, which is the Fe—Ta—N microcrystal magnetic thin film. Thus, uniformity of magnetic property of the metal magnetic film 23 and hence the soft magnetic property are improved.

Also, at this point, precious metal compounds such as Fe—Pt are generated in the metal magnetic film 23, thus forming magnetically hard portions in the metal magnetic film 23. Since these portions function to prevent movement of magnetic domains, rotation magnetization is promoted so that permeability in the high frequency region in the metal magnetic film 23 is improved.

In this embodiment, as described above, the $SiO_2$ film as an anti-reaction film 28 is formed within the track width regulating grooves 26, 27 and the winding groove 24 of the substrate 25 having the winding groove 24 formed thereon, and a metal magnetic thin film 29 as a multilayer film composed of the Fe—M—N magnetic thin film layers 21 which are the Fe—Ta—N microcrystal magnetic thin films, the precious metal layers such as Pt layers and the non-magnetic layer such as $SiO_2$ is formed on the anti-reaction film 28. However, for the purpose of reducing defects including breakage of glass due to the stress of the magnetic film, a mask may be used to prevent the above-described films from being formed on the entire surface inside the winding groove by sputtering. Such use of the mask does not affect the reproduction output.

Finally, the main surfaces as the magnetic recording medium contact surfaces are cylindrically ground, and then slicing is performed at positions indicated by lines a—a and b—b shown in FIG. 14. Thus, the magnetic head as shown in FIGS. 1 and 2 is completed.

Although the Fe—Ta—N microcrystal magnetic thin film is used as the Fe—M—N magnetic thin film layer 21 in the above-described embodiment, other metals may be used as the metal portion represented by M for obtaining similar effects and the magnetic head may be manufactured by similar processes.

As a matter of course, the present invention is not limited to the above-described magnetic head and may be applied to a variety of magnetic heads without departing from the scope of the present invention.

In the above-described embodiment, the present invention is applied to the magnetic head having such a structure that the metal magnetic thin film is formed in parallel to the magnetic gap. However, the present invention may also be applied to a magnetic head having such a structure that the magnetic gap is formed in the abutting surfaces of metal magnetic films respectively formed on tilted surfaces, which are formed by obliquely cutting out from the magnetic gap forming surfaces, or to a magnetic head having such a structure that the magnetic gap has an azimuth angle.

EXAMPLE

A preferred example according to the present invention will now be described on the basis of results of an experiment.

Figure 15:
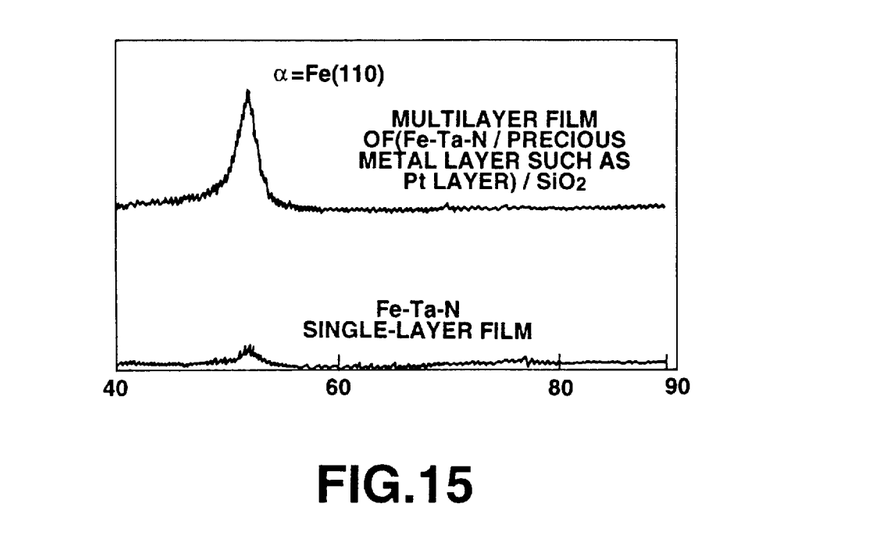
FIG. 15 is a chart showing X-ray diffraction patterns of the metal magnetic film.

In this experiment, a multilayer film having a total thickness of 4.0 μm formed by stacking eight multilayer films composed of five Fe—M—N magnetic thin film layers stacked via Pt layers each having a thickness of 1.0 nm, via two non-magnetic layers such as $SiO_2$ each having a thickness of 2.0 nm, in a metal magnetic film was heat-treated at 550° C. and then the X-ray diffraction pattern was examined. The result of this experiment is shown in FIG. 15. In comparison, FIG. 15 also shows the result with a single-layer film having only an Fe—M—N magnetic thin film layer with a thickness of 4.0 μm formed on the substrate.

As is clear from FIG. 15, the peak of α-Fe plane (110) is higher in the case of the multilayer film of (Fe—Ta—N layers/precious metal layers such as Pt layers)/$SiO_2$. That is, by thus stacking the Fe—Ta—N microcrystal magnetic thin films via the precious metal layers such as Pt layers, the orientation of α-Fe plane (110) is intensified and soft magnetic property particularly in the direction of thickness is improved. The above-described phenomenon is also observed in the case where precious metal elements of Au, Ag and Pd other than Pt are employed.

Figure 16:
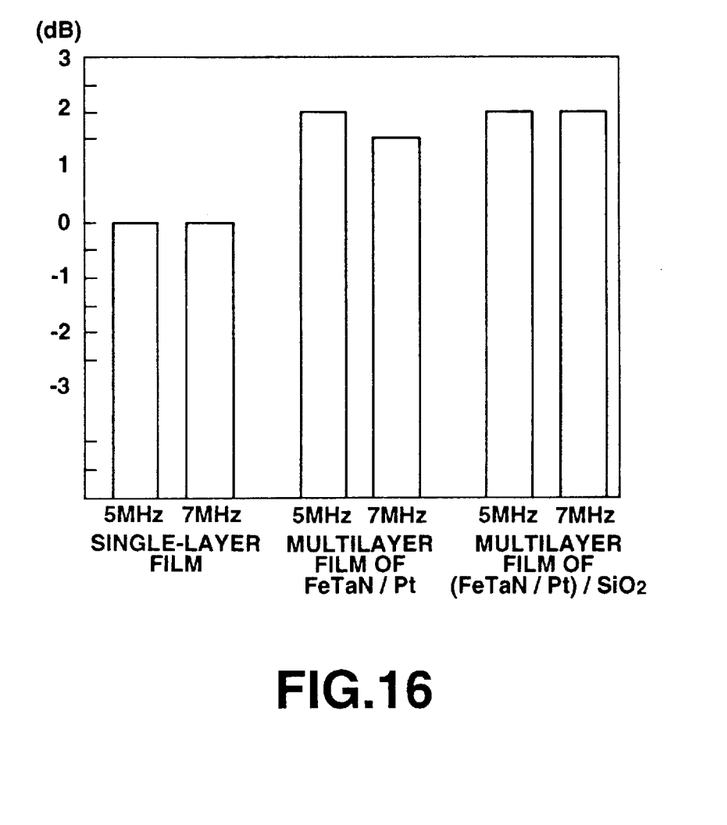
FIG. 16 is a graph showing the reproduction output of the magnetic head according to the present invention in comparison with the reproduction output of a comparative example.

The result of comparison of reproduction output with the magnetic heads produced by the above-described manufacturing method is shown in FIG. 16. The magnetic heads used for comparison are: a magnetic head having a soft magnetic multilayer film formed by stacking, via two $SiO_2$ layers each having a thickness of 2.0 nm, eight multilayer films of five stacked Fe—Ta—N/precious metal layers such as Pt with the precious metal layer having a thickness of 1.0 nm; a magnetic head having a soft magnetic multilayer film formed by stacking forty Fe—Ta—N magnetic thin film layers (that is, the same total number of Fe—Ta—N magnetic thin film layers as in the above-described magnetic head) via precious metal layers such as Pt layers with the precious metal layer having a thickness of 1.0 nm; and a magnetic head having an Fe—Ta—N single-layer film. In all these magnetic heads, the total thickness of the soft magnetic film is 4.0 nm.

FIG. 16 shows comparison output values, with the reproduction output of the magnetic head having the 4.0-nm single layer film being 0 dB. As a recording head, a metal-in-gap type magnetic head was employed in which Fe—Ru—Ga—Si films were formed in parallel on the gap surface.

As is clear from FIG. 16, the reproduction output is improved as the orientation of α-Fe plane (110) of the magnetic layer is intensified, and the head property in the high-frequency region is improved by stacking the multilayer films of Fe—Ta—N magnetic film layers/precious metal layers such as Pt layers via the non-magnetic film such as $SiO_2$.

As is clear from the above description, in the magnetic head of the present invention, a multilayer film formed by stacking Fe—M—N magnetic thin film layers and precious metal layers such as Pt layers is formed as a metal magnetic film on the magnetic gap forming surface of at least one of a pair of magnetic core halves. In forming microcrystal from an amorphous state by forming the Fe—M—N magnetic thin film layers and then performing heat treatment in the manufacturing process of the magnetic head, the underlying effect of the precious metal layers such as Pt layers causes an intense orientation of α-Fe plane (110) to occur in the heat-treated Fe—M—N magnetic thin film layers, thus improving uniformity of magnetic property of the metal magnetic film and hence soft magnetic property. Further, by stacking two or more of such multilayer films via a layer made of any one of $SiO_2$, $ZrO_2$, $Al_2O_3$ and Cr, a magnetostatic coupling film is formed. Therefore, uniformity of magnetic property is improved and soft magnetic property of the entire film up to the high-frequency region is improved.

Thus, the magnetic head of the present invention is significantly improved in reproduction output and therefore exhibits very high industrial value.

What is claimed is:

1. A metal in gap magnetic head comprising a pair of magnetic core halves joined together with magnetic gap forming surfaces thereof abutted to each other, and a metal magnetic film formed on the magnetic gap forming surface of at least one of the pair of magnetic core halves,
wherein,
the metal magnetic film comprises 2–10 stacked multilayer films separated by insulating layers,
the insulating layers comprise layers selected from the group consisting of $SiO_2$, $ZrO_2$, $Al_2O_3$ and Cr,
each of the multilayer films comprising a layer of $Fe_xM_yN_z$ (with M being at least one selected from the group consisting of Ta, Zr, Hf, Nb, Ti, Mo and W, and x, y and z indicating atomic percentage and having the relationships $71 \leq x \leq 85$, $6 \leq y \leq 15$, and $9 \leq z \leq 16$), and a precious metal layer selected from the group consisting of Pt, Au, Ag and Pd, the precious metal layer of a multilayer film generating an intense orientation of α-Fe plane (110), the thickness of the $Fe_xM_yN_z$ layer being between and including 0.05 to 1.0 μm, the thickness of the precious metal layer being between and including 0.3 to 10 nm, the combined thickness of all the precious metal layers being not more than 5% of the overall thickness of the metal magnetic film.

2. The magnetic head as claimed in claim 1, wherein the layer made of any one of $SiO_2$, $ZrO_2$, $Al_2O_3$ and Cr has a thickness per layer of 0.5 to 5.0 μm.

3. The metal in gap head of claim 1, wherein the combined thickness of all of the precious metal layers within the metal magnetic thin film being not more than 2% of the overall thickness of the metal magnetic film.

4. The metal gap head of claim 1, wherein element M of the composition $Fe_xM_yN_z$ is Ta.

5. The metal gap head of claim 1, wherein element M of the composition $Fe_xM_yN_z$ is Cr.

6. The metal gap head of claim 1, wherein element M of the composition $Fe_xM_yN_z$ is Hf.

7. The metal gap head of claim 1, wherein element M of the composition $Fe_xM_yN_z$ is Nb.

8. The metal gap head of claim 1, wherein element M of the composition $Fe_xM_yN_z$ is Ti.

9. The metal gap head of claim 1, wherein element M of the composition $Fe_xM_yN_z$ is Mo.

10. The metal gap head of claim 1, wherein element M of the composition $Fe_xM_yN_z$ is W.

11. The metal in gap head of claim 1, wherein the precious metal layer comprises Pt.

12. The metal in gap head of claim 1, wherein the precious metal layer comprises Au.

13. The metal in gap head of claim 1, wherein the precious metal layer comprises Ag.

14. The metal in gap head of claim 1, wherein the precious metal layer comprises Pd.

15. The metal in gap head of claim 1, wherein the insulating layer in the metal magnetic film is $SiO_2$.

16. The metal in gap head of claim 1, wherein the insulating layer in the metal magnetic film is $ZrO_2$.

17. The metal in gap head of claim 1, wherein the insulating layer in the metal magnetic film is $Al_2O_3$.

18. The metal in gap head of claim 1, wherein the insulating layer in the metal magnetic film is Cr.

* * * * *